United States Patent [19]

Asher et al.

[11] Patent Number: 5,452,123
[45] Date of Patent: Sep. 19, 1995

[54] METHOD OF MAKING AN OPTICALLY NONLINEAR SWITCHED OPTICAL DEVICE AND RELATED DEVICES

[75] Inventors: Sanford A. Asher; Song-Yuan Chang, both of Pittsburgh, Pa.; Seshadri Jagannathan, Rochester, N.Y.; Rasu Kesavamoorthy, Tamilnadu, India; Guisheng Pan, Pittsburgh, Pa.

[73] Assignee: University of Pittsburgh of the Commonwealth System of Higher Education, Pittsburgh, Pa.

[21] Appl. No.: 999,487

[22] Filed: Dec. 30, 1992

[51] Int. Cl.$^6$ ............................................. G02B 26/00
[52] U.S. Cl. ..................................... 359/296; 359/358; 359/886
[58] Field of Search ............... 359/350, 358, 885, 886, 359/290, 296, 326, 240, 589, 96, 103, 51; 372/21, 39; 385/17, 18; 252/582, 583

[56] References Cited

U.S. PATENT DOCUMENTS

| | | | |
|---|---|---|---|
| 3,620,597 | 11/1971 | Schwartz et al. | 359/243 |
| 4,548,473 | 10/1985 | Lo et al. | 359/885 |
| 4,627,689 | 12/1986 | Asher | 359/296 |
| 4,632,517 | 12/1986 | Asher | 359/296 |
| 4,648,686 | 3/1987 | Segawa | 385/17 |
| 4,717,508 | 1/1988 | DeMartino | 252/583 |
| 4,720,355 | 1/1988 | DeMartino | 252/582 |
| 4,766,171 | 8/1988 | DeMartino | 524/722 |
| 4,803,688 | 2/1989 | Lawandy | 372/21 |
| 4,828,362 | 5/1989 | Skinner et al. | 385/18 |
| 4,832,466 | 5/1989 | Nishimura et al. | 359/289 |
| 4,938,557 | 7/1990 | Blow | 385/45 |
| 4,986,635 | 1/1991 | Spry | 359/886 |
| 5,114,477 | 5/1992 | Mort et al. | 106/20 |
| 5,131,736 | 7/1992 | Alvarez | 359/886 |
| 5,142,418 | 8/1992 | Spry | 359/885 |
| 5,172,278 | 12/1992 | Tutt | 359/361 |
| 5,188,918 | 2/1993 | Ziolo | 430/106 |
| 5,250,378 | 10/1993 | Wang | 430/83 |
| 5,281,370 | 1/1994 | Asher et al. | 264/1.1 |

Primary Examiner—Georgia Y. Epps
Assistant Examiner—Thomas Robbins
Attorney, Agent, or Firm—Eckert Seamans Cherin & Mellott

[57] ABSTRACT

Methods for making a nonlinear optical device and related devices are disclosed. The method includes creating an ordered dispersion of charged particles in a surrounding medium. The charged particles and the surrounding medium are chosen such that they initially have identical refractive indices. In accordance with one aspect of the invention, cadmium sulfide inclusions are added to at least one of (a) the particles or (b) the medium. The cadmium sulfide inclusions have a highly nonlinear refractive index. The inclusions are optically nonlinear and upon high intensity radiation the refractive index of the particles change. This change in the refractive index occurs on the order of nanoseconds. In accordance with another aspect of the invention, a nonfluorescent dye is incorporated into at least one of (a) the particles or (b) the medium. The dye is photoabsorptive. Upon being impinged with high intensity radiation, the dye absorbs photons and heats the surrounding particles. This temperature increase causes a change in the refractive indices of the particles or medium. When the particle or medium refractive index is altered from that of the medium or particle the array diffracts light and prevents transmission of a specific wavelength. In accordance with yet another aspect of the invention, photorefractive materials such as lithium niobate or barium titanate substances can be used to induce the required optical nonlinearity. Related devices are also disclosed which exhibit high speed optical switching properties. The device may be employed advantageously in an optical computer or optical limiter.

57 Claims, 3 Drawing Sheets

METHOD OF MAKING AN OPTICALLY NONLINEAR SWITCHED OPTICAL DEVICE AND RELATED DEVICES

BACKGROUND OF THE INVENTION

This invention was made with government support under (a) Contract F33615-88-C-5432 awarded by the United States Air Force and (b) Grant No. AFOSR 91-0441 from the Air Force Office of Scientific Research. The government has certain rights in the invention.

1. Field Of The Invention

The present invention relates generally to a nonlinear optical device and method for making same. The method includes making a solid or crystalline colloidal ordered dispersion of charged particles within a medium and introducing into the particles or the medium a radiation responsive component which, when impinged with radiation at a critical intensity, causes a change in the refractive index of the particles in the ordered dispersion or the medium or both. A difference is established between the refractive index of the particles and the refractive index of the medium surrounding the particles so that the device becomes nonlinear in light transmission and Bragg diffracts a specific wavelength band of radiation.

2. Description Of The Prior Art

Charged colloidal particles, when suspended in water, form a stable dispersion due to interparticle coulomb repulsion forces. The property of structural ordering in such dispersions has been exploited in making devices such as narrow band optical rejection filters. The ordering phenomena in such colloidal suspensions has been useful in spectroscopy and Bragg diffraction techniques. See, for example, U.S. Pat. No. 4,986,635. It has been found that crystalline structures can have many practical applications as optical filters in military, space and research uses. In many such instances, it is necessary or desirable to filter narrow bands of selected wavelengths from a broader spectrum of incident radiation.

Asher, U.S. Pat. No. 4,627,689 discloses a linear crystalline colloidal narrow band radiation filter which is made by forming a highly ordered crystalline colloidal structure within a container. The crystalline colloidal structure is formed by dispersing the ionized particles, for example, polystyrene particles, within an appropriate solvent. U.S. Pat. No. 4,627,689 is owned by the assignee of the present invention.

A related disclosure was made in Asher, U.S. Pat. No. 4,632,517, which is also owned by the assignee of the present invention. That patent discloses another crystalline colloidal narrow band radiation filter application which forms the basis for a mechanically simple and highly efficient monochromator. It has application in improved systems for investigating RAMAN or emission spectra of selected sample materials. Both of the aforementioned patents disclose linear structures which can be used to diffract a narrow band of radiation from a broader band of radiation.

A solid filter and method of making a solid filter from an ordered dispersion of particles within a medium is disclosed in Asher, U.S. patent application Ser. No. 07/571,251 filed Aug. 22, 1990, entitled "Method of Making A Solid Crystalline Narrow Band Radiation Filter And Related Device." Application Ser. No. 07/571,251 is also owned by the assignee of the present invention. That application discloses a linear filter which is capable of Bragg diffracting narrow bands of radiation. It is a linear solid filter which has many practical applications.

Other filtering devices have also been known. For example, U.S. Pat. No. 4,803,688 discloses an ordered colloidal suspension for an optical device. The patent relates to the addition of a water-based polymer to a colloidal structure in order to make the structure rigid.

An optical filter was also disclosed in U.S. Pat. No. 4,548,473. The filter comprises a first substance substantially transparent to light within a select frequency range and having a first index of refraction. The filter also includes a second substance which has at least one resonance frequency within the first frequency range and a second index of refraction which is substantially the same as the first index of refraction at all of the frequencies within the first frequency range except for frequencies near the resonance frequency. This device is based upon resonance scattering by a disordered sample. The device is only a passive device meaning that the index of refraction is not considered to depend upon the incident intensity or time. Furthermore, the device is not a nonlinear device.

U.S. Pat. No. 3,620,597 discloses a device which is capable of acting as a nonlinear absorber of substantially all radiant energy in excess of a predetermined intensity. The mechanism utilized by the device is distinct from that of the present invention.

U.S. Pat. No. 4,832,466 discloses an optical element including a modulating liquid layer composed of a solvent containing a soluble polymer. The device requires polymers to precipitate from solution due to temperature changes. This is not required by the present invention.

U.S. Pat. No. 4,648,686 discloses an optical switch array which utilizes the temperature dependent characteristics of the index of refraction of a crystalline material, however, the device is limited to being used for switching in a waveguide. Other switches for use in waveguides were disclosed in U.S. Pat. Nos. 4,828,362 and 4,938,557.

U.S. Pat. No. 4,268,413 discloses devices having the property of reversibly variable temperature-light absorbance. The device is said to be usable in temperature-measuring devices, slippery ice warning devices and the like.

The above patents and patent application involve disordered and crystalline colloidal structures and other solid and liquid structures which exhibit only linear optical absorption, light scattering and diffraction properties.

In many instances it is preferred to provide a nonlinear optical filter. A nonlinear optical filter can serve as an optical switch which is extremely useful in many applications. For example, this nonlinear device has the advantage of being an "all optical" device, meaning that it does not require an external, nonoptical control input such as an electrical, acoustic or temperature input. Hence, the time response of the "all optical" device depends only on the properties of the radiation, such as intensity and wavelength, which are being filtered.

For these reasons, a nonlinear optical device is more desirable in many applications. For example, nonlinear filters would be desirable in applications in which human eye protection or electronic sensor protection is required against laser radiation threats in military applications or in space travel circumstances. In addition, a nonlinear optical filter may be desirable for other uses such as, for example, optical computing, for eye protection of medical personnel during laser surgery, for biotechnology sensor protection and in other scientific instrumentation.

Certain nonlinear optical materials have been known. For example, three commonly owned, related patents disclose organic nonlinear optical substrates. U.S. Pat. Nos. 4,766,171; 4,717,508; and 4,720,355 disclose an optically clear solid solution of poly(N,N-dimethylacrylamide) and 13,13-di(N-hexydecylamino)-14,14-dicyano-4,5,9,10-tetrahydropyrenoquinodimethane. However, these disclosures only relate to the discovery and synthesis of materials that have a large nonlinear refractive index.

Spry, U.S. Pat. No. 4,986,635, discloses an optical filter for blocking radiation of a preselected wavelength which comprises a colloidal suspension of an optical medium and a multiplicity of microspheres of optical dimensions in a substantially regular three-dimensional array. The optical medium and microspheres comprise materials having matched indices of refraction in the absence of incident radiation, but at least one index which varies nonlinearly with incident electric field, whereby index mismatch and resulting Bragg diffraction within the suspension is produced by incident radiation of the selected wavelength. This patent discloses pure spheres without any inclusions to facilitate alteration of the refractive index of the spheres and no suggestion of a change in refractive index by altering sphere temperature. Spry, also, is deficient in providing any information relative to the practical solution to putting the concept disclosed in Spry into practice.

There remains a need, therefore, for a nonlinear optical device which has a high speed switching capability at high radiation intensities which can be used for rejecting certain undesired wavelength bands from such high intensity radiation.

SUMMARY OF THE INVENTION

These and other needs are satisfied by the present invention which provides a method for making a nonlinear optical device and a related optical device. The filter effectively resists transmission of about 99.9% of radiation from a wavelength band. The material may operate as a high speed optical switch in that it becomes opaque to radiation within several nanoseconds.

The method utilizes an ordered crystalline colloidal array which can be either a dispersion of ionized colloidal particles in an appropriate fluid or a solid version consisting of either a close packed array of colloidal particles or a solid array with an intervening medium. As stated hereinbefore, in accordance with the invention either the colloidal particles or the surrounding medium both contain a material that has a radiation-sensitive refractive index. The refractive index of this material depends on the intensity and wavelength of the incident radiation.

In accordance with one embodiment of the invention, charged particles which are preferably polymer or silica spheres having a sulfonate coating on the surfaces of the spheres are dispersed in a medium. The particles form a self-ordered array due to the coulombic interparticle repulsion forces resulting from the negatively charged sulfonate ions on the surfaces of the spheres. A radiation-sensitive component is added to the particles. More specifically, the particles are impregnated or doped with quantum-sized inclusions of preferably cadmium sulfide, semiconductor materials. Other semiconductor quantum-sized inclusions could be added such as materials selected from the group consisting of cadmium selenide, cadmium sulfide/selenide composite, gallium arsenide, zinc oxide, lead sulfide and the like. They have a response time that is less than about one nanosecond. In addition, different semiconductor quantum inclusions respond to radiation of different wavelengths and different intensities and hence it is possible to tune the wavelength response of these devices to cover the entire near ultraviolet, visible and near infrared region of the electromagnetic spectrum.

These inclusions have refractive indices which are highly nonlinear. The particles with the inclusions are dispersed in a medium which initially has the same refractive index as that of the particles. Under normal illumination, radiation freely transmits through the device with only a small absorption. Under high incident illumination intensities, however, the refractive indices of the particles will diverge from the medium due to the large nonlinear refractive index of the CdS inclusions. Due to this difference in refractive indices, the ordered array of particles acts within several nanoseconds to switch on to selectively Bragg diffract radiation of a predetermined wavelength band from transmitting through the filter. As discussed hereinbelow, the filter is capable of selectively diffracting greater than 99.9% of the incident radiation. As noted, the filter material can switch to block transmission within several nanoseconds. A related device which may be either solid or a crystalline colloidal device which exhibits such properties is also provided.

In accordance with another aspect of the invention, particles are selected which are preferably polymer spheres having a sulfonate coating on the surface of the spheres. An ordered dispersion is created when the particles are dispersed in a medium due to the charges on each particle resulting from the sulfonate coating. The real part of the refractive index of the spheres is identical to that of the medium. The particles have contained within them a radiation absorbing component. In accordance with this embodiment, the method of changing the refractive index involves changing the temperature of the material. Many materials, especially polymers, have a large temperature coefficient of refractive index. This temperature dependence of the refractive index arises from the temperature dependence of the material density. Polymers are of such a density that they are extremely sensitive to temperature. By introducing a strongly light absorbing dye into the colloidal particles, or the medium surrounding the particles, the temperature of the particles or the medium and hence the refractive index can be selectively altered using radiation of appropriate wavelength and intensity. The device can be activated using light in any region of the electromagnetic spectrum (ultraviolet, visible or infrared) by using a dye that absorbs strongly at that wavelength region.

More specifically, a photoabsorptive, nonluminescent dye is introduced into the particles, for example, the dye absorbs radiation and generates heat to result in a temperature differential between the particles and the surrounding medium. The refractive index of the particles is highly temperature dependent. The particles and medium are chosen so that the temperature dependence of the refractive index of the particle and the medium in general differ and, hence, the refractive index mismatches when the temperature of the particles increases due to the heat generated by the dye. This thermally-induced change in refractive index occurs within several nanoseconds and changes the optical behavior of the filter material. The ordered array begins to diffract and the radiation diffracted increases rapidly as the refractive index mismatch increases. In this way, the material acts as an optical switch and Bragg diffracts a predetermined wavelength band of incident radiation. The wavelength diffracted is determined by the spacing and crystal structure of the array.

In accordance with yet a further aspect of the invention, a photorefractive material such as lithium niobate, lithium tantalate and barium titatrate can be used. Such materials have a large second order nonlinear refractive index or electro-optic Pockels coefficient. In accordance with this embodiment of the invention, these materials are doped with impurity ions such as $Fe^{2+}$, $Mn^{2+}$, $Rh^{3+}$ and $Cu^{+}$. When these dopants are present, charge separation can be created in the material optically. For example, lithium niobate crystals can contain small amounts of $Fe^{3+}$ and $Fe^{2+}$ impurity ions. Upon illumination of this material with visible radiation, charges in the form of electrons are excited from $Fe^{2+}$ impurity ions into the conducting band ($Nb^{5+}$). The charges migrate in the area illuminated by the light beam and become trapped by $Fe^{3+}$ impurity ions elsewhere outside the illuminated region. The crystal does not react instantaneously to this charge transfer. As a result, large electrical fields are created in the crystal. Because the material (lithium niobate) has a large second order nonlinear refractive index coefficient, a large change in refractive index is induced in the material.

By varying the molecular identity of the impurity ion in the crystal and its concentration, the material can be made to respond to radiation in the entire ultraviolet, visible and near infrared region of the spectrum.

In selecting the materials for the spherical particles for use in the dye embodiment of the invention it may be desirable to select said material such that the material under the influence of the heat generated experiences a phase change to a liquid, gaseous or different solid form. Such phase changes would contribute to enhancing the difference between the refractive indices between the particles and the medium.

In accordance with the method of the present invention, by selecting a particular radiation-sensitive material to be used in the fabrication of the colloidal crystalline filter, the temporal response of the nonlinear Bragg diffracting optical device can be varied from a few picoseconds to hundreds of milliseconds. This covers a range of nine orders of magnitude. The intensity of light necessary to produce the optical alteration can also be varied from a few kilowatts per $cm^2$ to several gigawatts per $cm^2$. The invention provides a device which is a versatile all optical switch which can be used for light shutters, optical computers, sensor protection in scientific and medical instrumentation, eye protection for welding or laser applications such as laser surgery. In addition, the filter is useful for many military applications. Overall, the device can be used with any product in which the disclosed radiation filtering characteristics are desirable.

It is an object of the present invention to provide a nonlinear optical switching device which can operate to Bragg diffract certain wavelength bands of high intensity radiation.

It is a further object of the invention to provide an optical switch or optical limiter which operates to block transmittance of wavelengths of radiation within several nanoseconds or in longer periods, if desired.

It is a further object of the invention to provide a method of creating a nonlinear optical device which can effectively filter 99.9% of the incident radiation.

It is another object of the invention to provide such a method and device which are adapted to be employed in the optical limiter embodiments or in the optical switch embodiment.

These and other objects of the invention will be more fully understood from the following description of the invention with reference to the illustrations appended hereto.

DESCRIPTION OF THE PREFERRED EMBODIMENTS

The present invention involves the method of making optical devices and the resultant devices. These objectives are accomplished by having special particles in a desired self-ordered array disposed within a medium. The index of refraction of the particles and medium are initially identical. Subsequent imposition of radiation of predetermined intensity and wavelength cause the index of refraction of at least one of (a) the particles or (b) the medium to change to create a divergence therein and cause the device to resist transmission of radiation of a specific wavelength therethrough. The predetermined wavelength and specific wavelength will be the same in the optical limiter embodiment and different in the optical switch embodiment.

Figure 1:
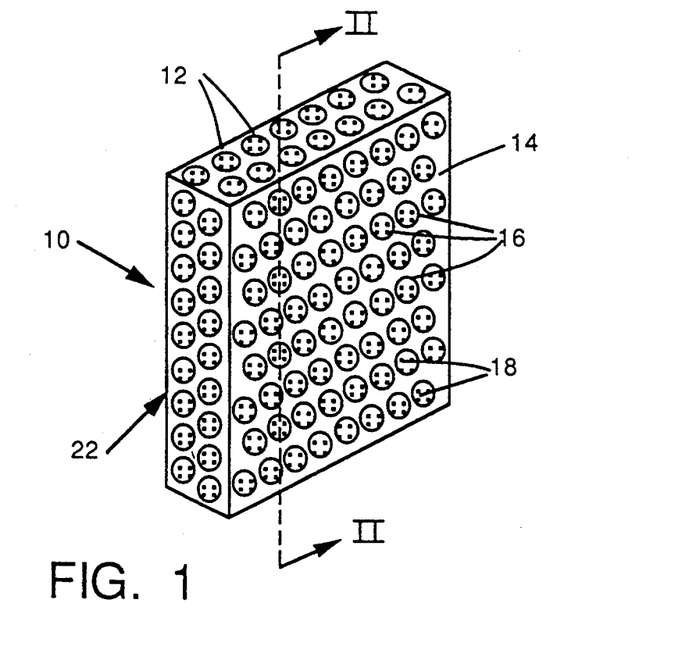
FIG. 1 is a schematic illustration of an ordered dispersion of particles in which the particles contain cadmium sulfide inclusions in accordance with one embodiment of the present invention.

With reference to FIG. 1, there is shown an ordered array 10. Ordered array 10 shows a group of particles 12. Particles 12 are interdispersed within a medium 14 which can either be liquid or solid. The ordered array 10 can be created in the manner which was disclosed in U.S. Pat. Nos. 4,632,517 and 4,627,689. The disclosure of both of which patents are hereby expressly incorporated herein by reference.

Briefly, particles 12 are colloidal spheres having a coating of an ionizable material (anionic or cationic) on their surfaces. Among the suitable ionizable materials are a sulfonate or quaternary amine. For example, the ionized sulfonate coating provides an electrical charge on the particles. The spheres form an ordered array due to the interparticle coulomb forces created by the charged sulfonate coating on each sphere. Specifically, particles 12 can be any particles selected from the group consisting of colloidal polystyrene, polymethylmethacrylate, silicon dioxide, aluminum oxide, polytetrafluoroethylene or any other suitable materials which are generally uniform in size and surface charge. The particles are chosen depending upon the optimum degree of ordering and the resulting lattice desired for the particular application.

Particles 12 preferably have a diameter between about 50 and 500 nanometers. The particles 12 may either be synthesized or obtained commercially. The particles 12, which may be polymer particles, can be synthesized by emulsion polymerization, or may be silicon dioxide prepared using the Stöber process.

The particles 12 are generally obtained in a medium 10 containing soluble ionic impurities. The particles 12 are first cleaned of the electrolyte and surfactant ionic impurities. The cleaning may be accomplished by dialysis against a bath of doubly distilled water including a mixed bed ion exchange resin. After dialysis, the particles 12 may be stored in a bath of, preferably, 10% by weight suspension of ion exchange resin called Analytical Grade AG501X8 mixed bed resin obtainable from Bio-Rad of Richmond, Calif. The ion exchange resin should preferably be cleaned prior to use through a suitable procedure such as that taught by Vanderhoff, et al. in the *Journal of Colloid Interface Science*, 1968, 28, 336–337.

In accordance with one embodiment of the invention, particles 12 are impregnated with a radiation-sensitive component selected from the group consisting of cadmium selenide, cadmium sulfide/selenide composite, gallium arsenide, zinc oxide, lead sulfide and the like. Exemplary particles collectively designated by reference character 16 in FIG. 1 contain cadmium sulfide inclusions 18. For simplicity of disclosure herein, the use of the expression "inclusions" shall include materials introduced into the interior of particles 12 and materials disposed on the surface thereof. Cadmium sulfide inclusions 18 are preferably between about 10 to 60 angstroms in diameter. The CdS inclusions 18 can be synthesized by mixing appropriate concentrations, as will be understood by those skilled in the art, of a soluble cadmium salt, such as cadmium nitrate or cadmium perchlorate with hydrogen sulfide or sodium sulfide. The particle size is controlled by controlling the reagent concentrations, reaction temperature, use of surfactant or adding reagents such as thiophenol to terminate the reaction when the required size is obtained. As shown in FIG. 1, preferably all of the particles 12 are impregnated with the cadmium sulfide inclusions 18 to a volume percentage of between about 1 and 15 percent and preferably to about 8 percent on a volume basis. The impregnation of the particles 12 with the cadmium sulfide inclusions 18 can be accomplished by directly introducing cadmium sulfide inclusions 18 using the following procedure. The cadmium sulfide quantum dots synthesized by the above procedure can be used as seeds during the emulsion polymerization of the polymer spheres or the synthesis by hydrolysis, of silica and other inorganic colloidals. Alternatively, in the case of porous colloidal spheres such as silica, the cadmium sulfide quantum dots can be incorporated after the synthesis of the colloidal spheres.

Yet a further procedure involves spheres which are suspended in water, methanol or ethanol and treated with a soluble cadmium salt, such as cadmium nitrate or cadmium perchlorate. Following this treatment hydrogen sulfide or sodium sulfide is introduced into the medium and this results in the precipitation of cadmium sulfide in the pores of the spheres. The size of the cadmium sulfide precipitate is determined by the pore size in the spheres, and this is on the order of about 10 to 100 Angstroms in the case of silica synthesized by the Stöber process.

This is preferably performed before particles 12 are dispersed in a medium 14, as discussed hereinafter, but it may be performed after the particles 12 are placed in the medium 14. The ultimate result is a composite colloidal sphere consisting of a homogeneous mixture of the polymer, or silica, and the cadmium sulfide dots.

EXAMPLE 1

A preferred method of making silicon dioxide spheres having cadmium sulfide inclusions will be considered. In the first step monodisperse colloidal $SiO_2$ is synthesized. In the second step CdS dots are introduced into the substrate $SiO_2$ particles.

The following process produced 120 nm monodisperse silicon dioxide spheres having a weight percent of up to about 15 percent cadmium sulfide inclusions.

The chemicals employed in this process were (a) Tetraethyl orthosilicate (TEOS, Fluka), distilled; (b) Methanol (Mallinckrodt), anhydrous, filtered through a 0.2 $\mu$m filter; (c) Ammonium hydroxide (29.9%); (d) Triton X-100 (Sigma); and (e) deionized (di) water; and the recipe was (a) Bath mixture: DI-water: 6.7 M/L in MeOH; $NH_3$ 0.85 M/L in MeOH; and Triton X-100, 4 ml; (b) Primary feed: TEOS—100 g; and (c) Secondary feed: 5.18 M/L $NH_3$ in aqueous solution.

The reaction to create the particles can be carried out in clean glassware or plastic flasks. The reaction occurred in a bath mixture of deionized water, ammonium hydroxide and triton X-100 in methanol. The TEOS and additional ammonium hydroxide were added using syringe pumps, their feeding rates were 0.5 L/min and 0.21 L/min for the primary feed and the secondary feed, respectively. The reaction was conducted in any constant temperature. The preferred temperature is 25° C. A constant stirring rate was provided throughout, it can be a stir bar or a mechanical stirrer. The hydrolysis of TEOS occurred very rapidly; however, it took three hours to complete the reaction sequence. The resulting particles have been characterized by dynamic light scattering given particle size of 143±00.7 nm.

Once monodisperse silica particles were obtained, the suspension was mixed with a desired concentration of Cd salt (e.g., $Cd(Ac)_2 \bullet 2H_2O$, $Cd(ClO_4)_2 \bullet 6H_2O$, and $Cd(NO_3)_2 \bullet 4H_2O$) solution. This enables the $Cd^{++}$ to be absorbed onto (and inside) the silica particles.

Finally, by reacting with $H_2S$, the $Cd^{++}$ were converted into CdS dots.

The cadmium sulfide dots were manufactured by the following process. 7.92 g cadmium perchlorate was added into a 100 ml of the above silica suspension (−7.2 g $SiO_2$). The mixture was placed in a shaker overnight. After that, it was mixed with 10 g of mixed resin prior to reaction with hydrogen sulfide. The supernatant suspension was separated from the resin and transferred into another reaction flask. It was placed in a cold bath of dry ice-acetone. The reaction was purged with nitrogen while slowly injecting a hydrogen sulfide-methanol solution into reaction flask. A yellow precipitate was gradually obtained. When the solution completely separated into a clear supernatant and a yellow layer and no more yellow precipitate found by titrating with $H_2S$-MeOH, the reaction was complete. A stable yellow suspension indicates that the reaction has been successful. The yellow precipitate was separated and washed with anhydrous methanol several times. 0.9 ml of 2-(4-chlorosulfonylphenyl)ethyltrimethoxysilane was mixed with this silica-CdS suspension to achieve the desired negatively changed surface. The final particles were cleaned using ultrafiltration and dialysis. This suspension show strong iridescence when mixed with mixed bed resin.

The particles 12, containing the cadmium sulfide inclusions 18, are then dispersed in medium 14 which may be water, glycerol, ethylene glycol, methanol, ethanol, dimethyl sulfoxide, phenyl methyl sulfoxide, dioxane, dimethylformamide, polyethylene glycol, or glycerine, or any material possessing similar properties. The preferred substance is a mixture of water and phenyl methyl sulfoxide.

The particles 12 within medium 14 in the form shown in FIG. 1 are placed in a generally rectangular chamber 22. Chamber 22 is, preferably, composed of quartz, LEXAN or LEXAN-coated glass. The suspension of particles 12 in medium 14 contained in chamber 22 may be diluted with deionized, doubly distilled water to provide a partial volume fraction in the range of about 0.5 to 75%. After this is accomplished, chamber 22 is sealed, and a colloidal dispersion of ordered particles 12 is formed.

In certain applications, a solid nonlinear array may be desired. One means for creating such an array is disclosed in my co-pending U.S. patent application Ser. No. 07/571,251 filed Aug. 22, 1990, the disclosure of which is expressly incorporated herein by reference. In that instance, a suitable solvent, such as benzene, toluene or chloroform may be added to a polymer latex solution and this is added to medium 14 (FIG. 1). This solidifies the medium and fuses particles 12 together and creates an ordered array 10 as shown in FIG. 1. The solvent is thereafter removed by evaporation to form a solid array. Other methods can also be used.

In accordance with the present invention, particles 12 and the medium 14 are chosen such that they initially have substantially equal refractive indices. For example, the refractive index of particles 12 and medium 14 may be between about 1.3 and 2.0. Intense illumination of a critical wavelength of between about 200 to 3,000 nanometers and preferably between about 500 and 800 nanometers causes the refractive index of the cadmium sulfide inclusions 18 to increase. This results in a change in the refractive index of particles 12. A difference between the refractive index of particles 12 and the refractive index of medium 14 is thereby established.

As discussed hereinbefore, the cadmium sulfide quantum inclusions have a large, nonlinear refractive index coefficient. Illumination by visible radiation results in the formation of a bound electron-hole pair, an exciton in the cadmium sulfide quantum inclusions, and dramatically increases its refractive index. Because the refractive index of the colloidal particles or spheres is an average of the refractive indices of the quantum inclusions and the polymer or silica that form the composite, an increase in the refractive index of the quantum inclusions also results in an increase in the refractive index of the colloidal particles or spheres.

As noted hereinbefore, the difference in the refractive index of particles 12 and medium 14 results in a change in the optical properties of the material. When the difference in the refractive indices is established, the ordered array 10 begins to diffract and block 99.9% of the incident radiation which meets the Bragg condition within about 100 psec to 100 nsec. In this way, ordered array 10 can be used as a high speed optical switch. This is because the cadmium sulfide inclusions 18 have large nonlinear components of the refractive index which respond in a matter of picoseconds to changes in incident radiation.

Figure 2:
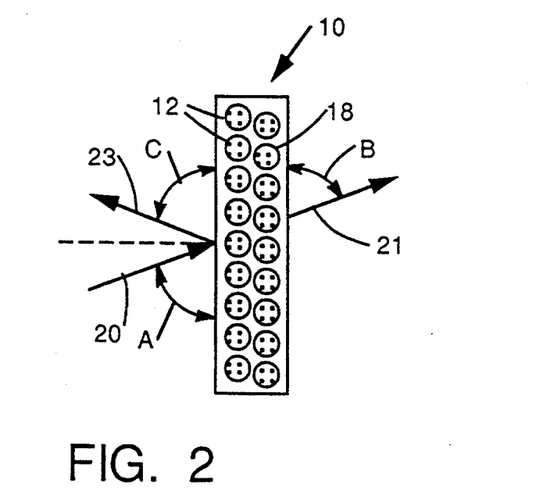
FIG. 2 is a cross section of the device of FIG. 1 along lines II—II and which illustrates the angle at which radiation is diffracted using the device of FIG. 1.

As shown in FIG. 2, a beam 20 of electromagnetic radiation is incident at angle A upon a filtering device 10, made in accordance with this aspect of the present invention. For low light intensities, all wavelengths transmit through filtering device 10 at a substantially equal angle B. However, at a sufficiently high light intensity of a particular wavelength described hereinbefore, the CdS inclusions 18 begin to affect the optical behavior of particles 12. Under such circumstances, a particular wavelength of incident beam 20 is almost entirely Bragg diffracted as shown by beam 23, which is diffracted at angle C.

It should be understood that under high incident illumination intensities the refractive index of particles 12 will diverge from that of the medium 14 and radiation in the selected bandwidth will be selectively diffracted and essentially blocked from being transmitted. The filter so constructed can, within several nanoseconds, selectively diffract greater than 99.9% of incident radiation.

EXAMPLE 2

A colloidal structure was created using silica spheres 12 having a sulfonate coating on the surface of each sphere. The spheres 12 had a diameter of between about 200 and 250 nanometers and a density of about 1.8 gm/cm$^3$. The spheres 12 were treated with a cadmium salt (cadmium nitrate) and cooled to about $-60°$ C. using a dry ice/acetone bath. The cooled suspension (in a water/ethanol mixture) was treated with hydrogen sulfide. After about 30 minutes, the suspension was allowed to warm up to room temperature. This resulted in the precipitation of quantum-sized cadmium sulfide inclusions in the pores of the silica. The suspension of spheres 12 in the medium 14 was concentrated to a total volume density of about $10^{13}$ to $10^{14}$ particles per cubic centimeter. The spheres 12 and medium 14 had an initial refractive index of about 1.52. The medium was prepared by mixing water with a high refractive index compound such as methyl phenyl sulfoxide.

This suspension was sealed in a chamber 22 (FIG. 1) which was made of quartz, and which had internal chamber dimensions of about 2 centimeters$\times$5 centimeters$\times$0.5 millimeters.

The device made in accordance with this aspect of the invention is useful for many applications, such as goggles for filtering laser light in military and space travel applications, as well as for light shutters, optical computing and other sensor protection. Alternatively, the material may be used for optical switching in medical and scientific instrumentation.

EXAMPLE 3

In accordance with yet another aspect of the invention, an ordered dispersion such as that shown in FIG. 1 was prepared, however, a different radiation responsive substance was used with particles 12. More specifically, the particles 12 are preferably polymers such as polyethylene tetrafluoride or polymethylmethacrylate (PMMA) particles or other ionic particles, each particle having a sulfonate or other ionizing coating on its surface. The particles 12 are dispersed in a medium 14 as discussed more fully hereinbelow. In accordance with this aspect of the invention, however, the particles 12 contain a photoabsorbing, nonfluorescent dye which absorbs photons from incident light radiation in the spectral region of interest. Preferably, for light in the green portion of the spectrum, the nonemitting dye is OIL-RED O (a weakly acid diazo oil-soluble dye, which is 1-8-[4-(Dimethylphenylazo)dimethylphenylazo]-2-naphthalenol) which may be obtained from Aldrich of Milwaukee, Wis. Alternatively, other dyes such as those selected from the group consisting of Vitamin B-12, UNIBLUE and FERROCENE can be employed, if desired. For other spectral regions, other dyes can be used as reasonably selected by one skilled in the art based on the teachings herein.

The dyes may be either covalently attached or noncovalently trapped inside the particles 12. The particles 12 are saturated with the dye such that each particle 12 contains at least about 100,000 to 1,000,000 or more molecules per sphere of dye substance. When the photons are absorbed by the dye, the dye molecules heat up and this in turn heats the particles by heat conduction. As stated hereinbefore, the refractive index of a material is greatly temperature dependent. Thus, heating of the particles 12 causes a change in the refractive index of the particles. In a preferred embodiment of the invention, the particles may be comprised of a material selected to undergo a phase transition, melting upon being subjected to radiation of the desired wavelength, resulting in a large refractive index change. Materials that could be used to undergo phase transition include short chain hydrocarbons, such as paraffins, for example.

The particles 12 are dispersed in a medium 14 which is chosen so that the particles 12 and the medium 14 initially have matched refractive indices at ambient temperatures.

The medium may be water containing about 50 to 65 percent on a volume basis of a second material selected from the group consisting of methylphenylsulfoxide, diphenylsulfoxide, m-cresol, styrene glycol, ethylene glycol, and glycerine. The additive is combined with the water in order to achieve the correct refractive index to match the refractive index of the particles 12. Other materials known to those skilled in the art could also be used. When water is used as the medium, a highly preferred embodiment of the invention incorporates Teflon (polytetrafluoroethylene) particles, as Teflon has a low refractive index of 1.36, very close to that of water, 1.33, in the visible light region. In general, not just Teflon but other highly fluorinated polymers may be employed advantageously in particles 12.

EXAMPLE 4

A suitable highly fluorinated polymer for use in particles 12 of the embodiment is poly(1,1-heptafluorobutyl methacrylate) (PFBMA).

Initial-Charge Method

In a first method of synthesizing PFBMA, an initial-charge method, is performed at a temperature of about 50° C. with a reaction time of about 2 hours. About 0.060 grams of $C_{12}H_{25}SO_3Na$ (sodium dodecyl sulfate) (SDS) is added to 20 grams of water. SDS serves as an emulsifier to control particle size. About 0.100 grams of COPS-1 (1-allyloxy-2-hydroxypropane sulfonic acid, sodium salt) ($CH_2\!\!=\!\!CHCH_2OCH_2CH(OH)CH_2SO_3Na$) serves as an ionic comonomer to provide a negative charge for the colloidal particles. About 0.150 grams of ethylene glycol dimethacrylate (EGDMA) ($CH_2\!\!=\!\!CH(CH_3)COOCH_2CH_2OOC(CH_3)CH\!\!=\!\!CH_2$) is then added as a cross-linking agent. Next monomer 1,1-heptafluorobutyl methacrylate (FBMA) ($CH_2\!\!=\!\!CH(CH_3)COOCH_2CF_2CF_2CF_3$) is added in an amount of about 4.00 grams. Finally about 0.020 grams of sodium persulfate ($Na_2S_2O_8$) is added to function as an initiator. The desired particles were produced in about 2 hours.

Shot-Growth Method

This process produced particles in a two stage procedure carried out at about 50° C. In the initial stage about 4.00 grams of FBMA were added to about 20 grams of water in the presence of about 0.080 gram of SDS to control particle size and also about 0.155 gram of EGDMA and 0.020 gram $Na_2S_2O_8$. After about 1 hour when conversion reached 80–90%, additional monomer FBMA in the amount of 1.00 gram and 0.160 gram COPS-1 along with 2.00 grams of water and 0.010 gram of $Na_2S_2O_8$ were added. The process was completed in an additional 2 hours, i.e., a total of 3 hours. The ratio of COPS-1 to FBMA in the second stage mixture determines the final surface charge density.

Table 1 shows the properties of the spheres created by these two processes in which particles may be created with a sulfonate coating.

TABLE 1

| Particle Property | Initial-Charge Method | Shot-Growth Method |
| --- | --- | --- |
| Size | 108 nm | 91 nm |
| Monodispersity | .044 | .022 |
| Solid Level | 16.50% | 19.91% |

The product of the shot-growth method, in these tests, exhibited better monodispersity than the product of the initial-charge method.

A photoabsorbing nonfluorescent dye may be impregnated into the fluorinated polymer spheres.

When the photoabsorbing, nonfluorescent dye absorbs photons from incident radiation, a thermal refractive index nonlinearity is established. More specifically, the temperature of the particles 12 is raised by heat conduction. This change in temperature results in a change in the refractive index of the particles 12. With the increase in particle temperature due to the increased temperature of the dye molecules, the refractive index of the particles 12 diverges from the refractive index of the medium 14. This occurs rapidly between about 1 and 100 nanoseconds. This difference in the refractive indices causes a rapid change in the optical behavior of the overall ordered array 10 such that transmittance rapidly decreases. It has been found that this change can occur within about 10 nanoseconds. The required wavelength at which the transmittance will be at a minimum can be obtained by properly choosing the particle concentration in ordered array 10 and the composition of medium 14.

Figure 3:
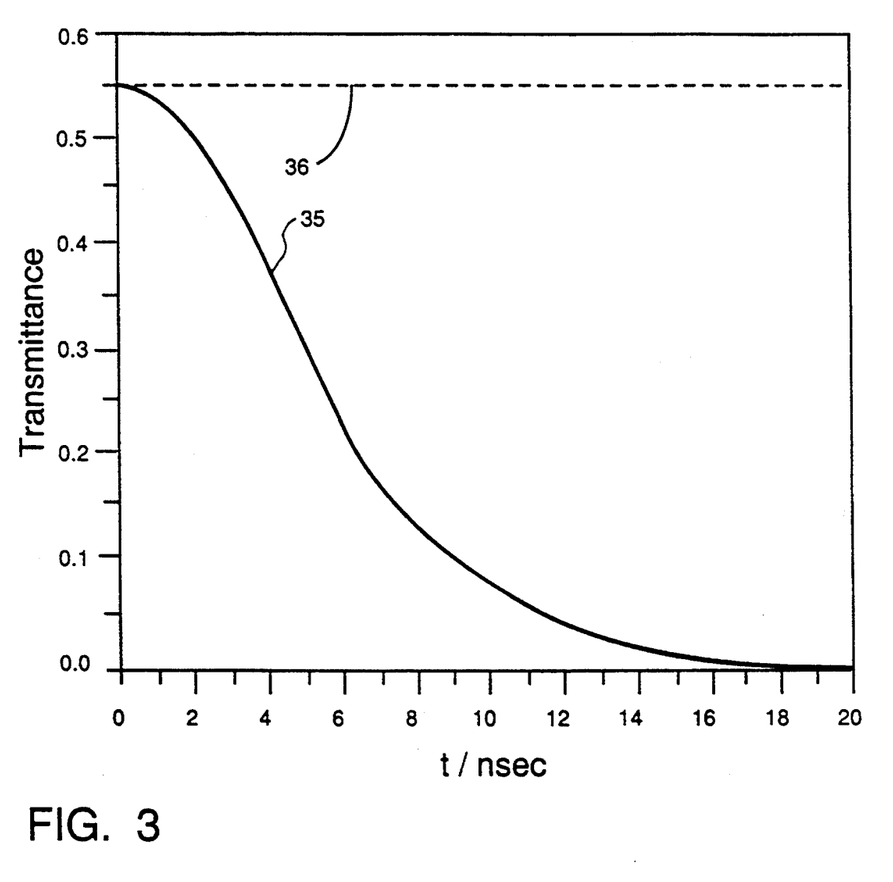
FIG. 3 is a graph of one embodiment of the invention representing transmittance of radiation on the y-axis plotted against time in nanoseconds on the x-axis.
Figure 4:
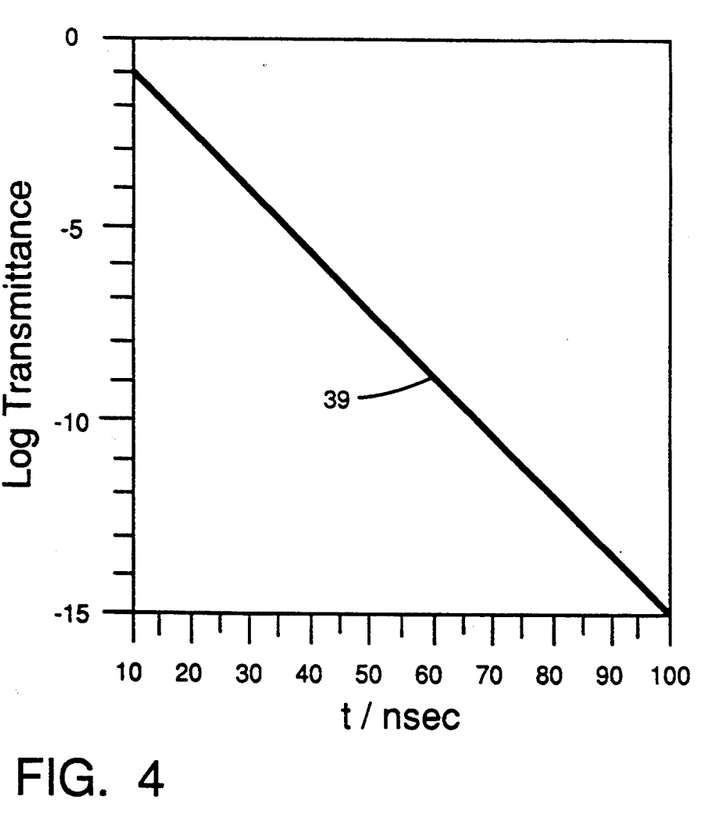
FIG. 4 is a graph of the same data as plotted in FIG. 3 with the exception that transmittance is plotted on a logarithmic scale.

The behavior of the ordered array 10 constructed in accordance with this embodiment of the invention can be understood with reference to FIG. 3. FIG. 3 is a calculated graph of the transmittance of an incident beam of a wavelength of about $\lambda = 450$ nm, of incident intensity of about 10 MW/cm$^2$ through about 50 $\mu$m thick dyed, index-matched PMMA FCC colloidal crystal at about 90° as a function of time along the X-axis. Curve 35 indicates that transmission of incident radiation reduces to zero within less than about 20 nanoseconds. Dashed curve 36 shows that if the Bragg condition is not satisfied, radiation freely transmits through the device. Referring to FIG. 4, curve 39 is on a logarithmic scale and shows the rapid response time of the optical limiter as a switch.

Polymethylmethacrylate spheres were chosen for creating a filtering device using the photoabsorbing dye component. The refractive index of the polymethacrylate (PMMA) spheres was about 1.492 at ambient temperature and the rate of decrease of its refractive index was about $1.1 \times 10^{-4}$ per degrees Kelvin. Water has a refractive index at ambient temperature of 1.336. Therefore, a suitable additive had to be combined with the water to match the refractive indices of medium 14 and particles 12. The additive was chosen to be methylphenylsulfoxide (MPSO). The refractive index of the mixtures of water and dimethylphenylsulfoxide were measured as a function of the temperature using a refractometer. From this measurement, the fraction of dimethylphenylsulfoxide required to be added to the medium in order to match the medium refractive index of the PMMA spheres 12 at ambient temperature was determined. More specifically, the refractive index of PMMA (about 1.492) at 293° K. is identical to that of a solution containing about 65% of MPSO which has a refractive index of about 1.57 and about 35% water which has a refractive index of about 1.33. This colloidal array will, thus, not Bragg diffract light due to the refractive index match between the spheres and the medium. When the suspension is irradiated with a laser pulse absorbed by the dye, the particle temperature will increase relative to that of the medium. Since the temperature derivative of the refractive index of PMMA is $-1.1 \times 10^{-4}/K.$, the refractive index mismatch, $\equiv |\Delta n|$ will increase with temperature. As the particle refractive index diverges from the medium, the colloidal crystal will Bragg diffract and the transmission will decrease for light meeting the Bragg condition, as will be understood by those skilled in the art. The transition from high transmission to low transmission occurs within a few nanoseconds. Thus, the device functions as a nanosecond-fast optical switching device. The device can be used as a switching device which is operable between about 1 to 100 nanoseconds.

EXAMPLE 5

In accordance with yet another aspect of the invention, an optical limiter using a photorefractive process may be created. Lithium niobate, lithium tantalate and barium titanate particles are doped with transition metal impurity ions such as $Fe^{2+}$, $Mn^{2+}$, $Rh^{3+}$ and $Cu^{+}$. When these dopants are present, charge separation can be created in the material optically. For example, lithium niobate crystals can contain small amounts of $Fe^{3+}$ and $Fe^{2+}$ impurity ions. Upon illumination of this material with visible radiation, charges in the form of electrons are excited from $Fe^{2+}$ impurity ions into the conducting band ($Nb^{5+}$). The charges migrate out of the light beam and become trapped by $Fe^{3+}$ impurity ions elsewhere outside the illuminated region. The crystal does not reorganize instantaneously upon this charge transfer. As a result, large electrical fields are created in the crystal. Because the material (lithium niobate) has a large second order nonlinear refractive index coefficient, a large change in refractive index is induced in the material.

As noted hereinbefore, by varying the molecular identity of the impurity ion in the crystal and its concentration, the material can be made to respond to radiation in the entire ultraviolet, visible and near infrared region of the spectrum. In other words, when high intensity radiation impinges upon the particles, the impurities create static electric fields that induce a large change in the refractive index of lithium niobate and hence the overall refractive index of the material changes. Intensity at certain wavelengths between about 300 nm and 1500 nm is thereby Bragg diffracted.

Other materials can be used to create the response discussed hereinbefore such as lithium tantalate inclusions that are doped with iron, manganese, rhodium or copper. Typically, a colloidal dispersion will be created which includes polymer spheres, or inorganic spheres, such as silica spheres, that contain about 10% by volume of one of the above-mentioned photorefractive materials.

EXAMPLE 6

A colloidal form of the photorefractive material can be prepared using barium titanate according to procedure of K. S. Mazdiyasni, et al., *Journal of the American Ceramic Society*, 1969, Vol. 52, pp. $523 \geq 526$ and using the photorefractive material as a seed for the synthesis of the colloidal silicon dioxide or polymer spheres. The resultant composite spheres can be coated or modified with surface sulfonate groups, to provide the surface charge. By dispersing the spheres in an appropriate medium, such as a water/methyl phenyl sulfoxide mixture, an ordered colloidal array can be formed. The diffraction wavelength maximum of this array is determined by the sphere volume fraction and the array refractive index. When the refractive index of the spheres is made the same as that of the medium, the device will be completely transparent. However, when illuminated by radiation of appropriate wavelength and intensity, the refractive index of the spheres will change and the device will diffract away essentially all of the incident radiation. This device can be made to respond to all wavelengths in the ultraviolet, visible and near infrared regions, by varying the photorefractive material and dopant impurity. The time response of the device can be varied from a few seconds to less than nanoseconds by varying the impurity concentration and the intensity of the incident radiation.

It will be appreciated that the invention has provided a method and apparatus for creating a high speed optical switch which can be used as a filtering device against a laser threat or other high intensity radiation exposure. In addition, the device is useful for eye protection and as a light shutter. Further, the nanosecond device is useful in optical computing, optical communications and in other optical applications in scientific and medical instrumentation. The disclosure includes several embodiments and aspects of the method and apparatus which provide for versatility of application.

It will also be appreciated that the present invention may have advantageous application to optical computing applications. The nature of the optical device of the present invention is such that a relatively small device could provide a very large number of optical switches. The array, for example, could contain at least $10^4$ independent pixels or optical switches. In addition, such a use permits parallel processing. It could, for example, be employed to numerically process images. Also, for example, a first image could be compared with a second image or a series of images to determine which are the same and which are different.

In optical computer applications, the invention may be employed as parallel optical gates.

In an example of an optical computer embodiment employing an optical switch of the present invention in computer gates, a series of gates are operatively associated with each other in series. In a situation where any one of three different events will make it desirable to preclude passage of light of wavelength P through an array of three filters the light source may be positioned to direct light of wavelength P through all three filters in the absence of any of the three filters blocking passage of the wavelength P light. A first filter may have a first dye energized by light of wavelength A to alter the index of refraction in the first filter to block passage of wavelength P. Similarly, a second filter may have a second dye which when energized by light of wavelength B will alter the index of refraction in the second filter to cause the second filter to block passage of light of wavelength P. Also a third filter may have a third dye which is responsive to impingement of light of wavelength C to alter the index of refraction to block passage of light of wavelength P. As a result, any event which triggers light of predetermined intensity of any one of wavelengths A, B or C on their respective filters will cause the filter to block passage of light of wavelength P through the filter array. It will be appreciated that for different needs different numbers of filters and different wavelengths can be employed as desired.

For simplicity of disclosure, reference has been made herein to both the particles and the medium having the same index of refraction and the preferred practice of subsequently altering the index of refraction of the particles to achieve the desired differences in index of refraction between the particles and media. If desired, through cadmium sulfide inclusions dyes and other means introduced into the medium, the index of refraction of the medium may be altered while leaving the index of refraction of the particles unchanged. Also, if desired, both the particles and medium can have their indices of refraction altered in a manner that enlarges the difference between the indices of refraction.

It will be appreciated that in the present invention the predetermined wavelength of the light employed to energize a change in the index of refraction of the particles or medium or both may be (a) identical to the specific wavelength of the light to be filtered as in the optical limiter embodiment such as in gaggles or (b) may be different from the specific wavelength to be filtered as in optical switches such as in optical computer uses.

Whereas particular aspects of the method of the present invention and particular embodiments of the invention have been described for purposes of illustration, it will be appreciated by those skilled in the art that numerous variations of the details may be made without departing from the invention as described in the appended claims.

What is claimed is:

1. A method of making a nonlinear optical device which becomes opaque to undesired radiation transmission, including the steps of
    selecting charged particles having a first refractive index, and selecting a medium having said first refractive index such that said optical device is transmittive of incident radiation which is below a predetermined radiation intensity at a predetermined wavelength,
    incorporating into at least one of (a) said particles or (b) said medium, a quantity of quantum-sized inclusions having the property that when exposed to radiation at a predetermined wavelength and intensity, cause a divergence between the refractive index of said particles and the refractive index of said medium such that radiation transmission of a specific wavelength is substantially entirely resisted by said optical device,
    introducing said particles in said medium, and
    forming an ordered array of said particles within said medium.

2. The method of claim 1 including
    employing said method to make an optical limiter having said predetermined wavelength equal to said specific wavelength.

3. The method of claim 1 including
    employing said method to make an optical switch having said predetermined wavelength not equal to said specific wavelength.

4. The method of claim 1 including
    incorporating said inclusions in said particles, and
    selecting said quantum-sized inclusions from the group consisting of cadmium sulfide, cadmium selenide, cadmium sulfide/selenide composite, gallium arsenide, zinc oxide and lead sulfide.

5. The method of claim 4 including
    selecting as said quantum-sized inclusions, cadmium sulfide inclusions and incorporating into each said particle a quantity of said cadmium sulfide inclusions of about 1 to 15 percent on a particle volume basis.

6. The method of claim 5 including incorporating into said particles cadmium sulfide inclusions which are spheres.

7. The method of claim 1 including
    incorporating said quantum-sized inclusions into said particles in sufficient quantities to establish a resistance to radiation transmission in the wavelength range of about 200 nm to 3000 nm.

8. The method of claim 1 including
    selecting as said particles, silica spheres having an ionizable material coating on the surface of each sphere.

9. The method of claim 8 including
    selecting said coating from the group consisting of sulfonate coatings and quaternary amine coatings.

10. The method of claim 1 including
    selecting said charged particles from the group consisting of colloidal polystyrene, polymethylmethacrylate, silicon dioxide, aluminum oxide and polytetrafluoroethylene.

11. The method of claim 1 including
    solidifying said array of particles in said medium by introducing a second substance into said array to fuse said particles together, and
    evaporating at least a substantial portion of said second substance and said medium from said array to condense said particles into a solid, three dimensional structure.

12. The method of claim 11 including
    selecting said second substance from the group consisting of benzene, toluene and chloroform.

13. The method of claim 12 including
    incorporating said cadmium sulfide spheres having a diameter between about 10 and 60 angstroms.

14. The method of claim 1 including providing as said medium a first liquid medium.

15. The method of claim 14 including
    providing as said medium a first liquid medium substances selected from the group consisting of water, glycerol, ethylene glycol, methanol, ethanol, dimethyl sulfoxide, phenyl methyl sulfoxide, dioxane, dimethylformamide, polyethylene glycol and glycerine.

16. A method of making an optical device which becomes opaque to undesired radiation transmission, including the steps of selecting charged particles having a first refractive index, and selecting a first medium having said first refractive index such that said particles and said medium are transmittive of incident radiation which is below a predetermined intensity at a predetermined wavelength, impregnating at least one of (a) said particles or (b) said medium with a photoabsorbing dye substance, said dye substance being absorptive of photons from incident radiation of predetermined intensity and wavelength such that heat is generated by such dye substance, whereby the temperature of said particles or said medium respectively is altered, causing a change in the refractive index of said particle or said medium respectively such that the refractive index of said particle or said medium diverges from said first refractive index to establish a difference between the refractive index of said particles and the refractive index of said medium such that radiation transmission is substantially entirely resisted for radiation of a specific wavelength, introducing said particles into said medium, and forming an ordered array of said particles within said medium.

17. The method of claim 16 including
employing said method to make an optical limiter having said predetermined wavelength equal to said specific wavelength.

18. The method of claim 16 including
employing said method to make an optical switch having said predetermined wavelength not equal to said specific wavelength.

19. The method of claim 16 including
providing as said medium a first liquid medium.

20. A method of making an optical device which becomes opaque to undesired radiation transmission, including the steps of selecting charged particles having a first refractive index, and selecting a first medium having said first refractive index such that said particles and said medium are transmittive of incident radiation which is below a predetermined intensity at a predetermined wavelength, impregnating at least one of (a) said particles or (b) said medium with a photoabsorbing dye substance, said dye substance being absorptive of photons from incident radiation of predetermined intensity and wavelength such that heat is generated by such dye substance, whereby the temperature of said particles or said medium respectively is altered, causing a change in the refractive index of said particles or said medium respectively such that the refractive index of said particles or said medium diverges from said first refractive index to establish a difference between the refractive index of said particles and the refractive index of said medium such that radiation transmission is substantially entirely resisted for radiation of a specific wavelength, introducing said particles into said medium, forming an ordered array of said particles within said medium, and impregnating said dye substance into said particles to an amount of at least about 100,000 to 1,000,000 molecules per particle.

21. The method of claim 20 including
impregnating said dye substance into said particles by saturating said particles with said dye substance.

22. The method of claim 21 including
providing as said dye substance a nonfluorescent dye.

23. The method of claim 22 including selecting said dye substance from the group consisting of OIL-RED O, Vitamin B-12, UNIBLUE and FERROCENE.

24. A method of making an optical device which becomes opaque to undesired radiation transmission including the steps of selecting charged particles having a first refractive index, and selecting a first medium having said first refractive index such that said particles and said medium are transmittive of incident radiation which is below a predetermined intensity at a predetermined wavelength, impregnating at least one of (a) said particles or (b) said medium with a photoabsorbing dye substance, said dye substance being absorptive of photons from incident radiation of predetermined intensity and wavelength such that heat is generated by such dye substance, whereby the temperature of said particles or said medium respectively is altered, causing a change in the refractive index of said particles or said medium respectively such that the refractive index of said particles or said medium diverges from said first refractive index to establish a difference between the refractive index of said particles and the refractive index of said medium such that radiation transmission is substantially entirely resisted for radiation of a specific wavelength.

introducing said particles into said medium, forming an ordered array of said particles within said medium, and selecting as said charged particles, silica spheres with a sulfonate coating on each sphere.

25. A method of making an optical device which becomes opaque to undesired radiation transmission, including the steps of selecting charged particles having a first refractive index, and selecting a first medium having said first refractive index such that said particles and said medium are transmittive of incident radiation which is below a predetermined intensity at a predetermined wavelength, impregnating at least one of (a) said particles or (b) said medium with a photoabsorbing dye substance, Said dye substance being absorptive of photons from incident radiation of predetermined intensity and wavelength such that heat is generated by such dye substance, whereby the temperature of said particles or said medium respectively is altered, causing a change in the refractive index of said particles or said medium respectively such that the refractive index of said particles or said medium diverges from said first refractive index to establish a difference between the refractive index of said particles and the refractive index of said medium such that radiation transmission is substantially entirely resisted for radiation of a specific wavelength, introducing said particles into said medium, forming an ordered array of said particles within said medium, and selecting said charged particles from the group consisting of polystyrene, polymethylmethacrylate, silicon dioxide, aluminum oxide and polytetrafluoroethylene.

26. A method of making an optical device which becomes opaque to undesired radiation transmission, including the steps of selecting charged particles having a first refractive index, and selecting a first medium having said first refractive index such that said particles and said medium are transmittive of incident radiation which is below a predetermined intensity at a predetermined wavelength, impregnating at least one of (a) said particles or (b) said medium with a photoabsorbing dye substance, said dye substance being absorptive of photons from incident radiation of predetermined intensity and wavelength such that heat is generated by such dye substance, whereby the temperature of said particles or said medium respectively is altered, causing a change in the refractive index of said particles or said medium respectively such that the refractive index of said particles or said medium diverges from said first refractive index to establish a difference between the refractive index of said particles and the refractive index of said medium such that radiation transmission is substantially entirely resisted for radiation of a specific wavelength, introducing said particles into said medium, forming an ordered array of said particles within said medium, providing as said medium a first liquid medium, and providing as said first liquid medium substances selected from the group consisting of water, methylphenylsulfoxide, diphenylsulfoxide, m-cresol and styrene glycol.

27. The method of claim 26 including solidifying said array of particles in said medium by introducing a second substance into said array to fuse said particles together, and evaporating at least a substantial portion of said second substance and said first liquid medium from said array to condense said particles into a solid, three-dimensional structure.

28. A method of making an optical device which becomes opaque to undesired radiation transmission, including the steps of selecting charged particles having a first refractive index, and selecting a first medium having generally said first refractive index such that said particles and said medium are transmittive of incident radiation which is below a predetermined radiation intensity at a predetermined wavelength, and introducing into at least one of said particles and said medium a photorefractive material having a large second order nonlinear refractive index.

29. The method of claim 28 including introducing said photorefractive material into said particles, and selecting said photorefractive material from the group consisting of lithium niobate, lithium tantalate and barium titanate.

30. The method of claim 29 including doping said particles with impurity ions, and selecting said impurity ions from the group consisting of $Fe^{2+}$, $Mn^{2+}$, $Rh^{3+}$ and $Cu^+$.

31. The method of claim 28 including selecting as said charged particles, silica spheres with a sulfonate coating on said sphere.

32. The method of claim 28 including selecting the material for said charged particles from the group consisting of polystyrene, polymethylmethacrylate, silicon dioxide, aluminum oxide and polytetrafluoroethylene.

33. The method of claim 32 including providing as said first liquid medium substance selected from the group consisting of water, methylphenylsulfoxide, diphenylsulfoxide, m-cresol and styrene glycol.

34. The method of claim 33 including establishing an array of said particles in said medium, solidifying said array of particles in said medium by introducing a second substance into said array to fuse said particles together, and evaporating at least a substantial portion of said second substance and said first liquid medium from said array to condense said particles into a solid, three-dimensional structure.

35. The method of claim 28 including providing as said medium a first liquid medium.

36. The method of claim 28 including selecting as the material for said particles a highly fluorinated polymer.

37. The method of claim 36 including selecting as said particles material poly(1,1-heptafluorobutyl) methacrylate.

38. A nonlinear optical device, comprising an array of charged particles having a lattice spacing between said particles maintained by coulomb repulsion forces between said particles, said array having a first refractive index, a surrounding medium disposed within the interstices between said particles also having said first refractive index, and a radiation responsive component having the property of changing the refractive index of at least one of (a) said particles and (b) said medium at a predetermined radiation intensity and wavelength such that radiation transmission of a specific wavelength is substantially entirely resisted.

39. The optical device of claim 38 wherein said radiation responsive component is composed of cadmium sulfide inclusions dispersed within said particles.

40. The optical device of claim 39 wherein said cadmium sulfide inclusions are spheres.

41. The optical device of claim 39 wherein said cadmium sulfide inclusions are dispersed within said particles to an amount of between about 5 and 15 percent on a particle volume basis.

42. The optical device of claim 38 wherein said radiation responsive component is a photoabsorptive, nonfluorescent dye which is impregnated into said particles, said dye having the property of absorbing photons from incident radiation of a predetermined intensity and wavelength and generating heat such that temperature of the particles is increased whereby the refractive index of said particles is changed.

43. The optical device of claim 42 wherein said photoabsorbing dye is a substance selected from the group consisting of 1-8-[4-(Dimethylphenylazo)dimethylphenylazo-2-naphthalenol, Vitamin B-12 and ferrocene.

44. The optical device of claim 38 wherein said particles are selected from the group consisting of silica, polystyrene, polymethylmethacrylate, silicon dioxide, aluminum oxide and polytetrafluoroethylene.

45. The optical device of claim 38 wherein
said particles are made of a highly fluorinated polymer.

46. The optical device of claim 45 wherein
said particles are made of a poly(1,1-heptafluorobutyl) methacrylate.

47. The optical device of claim 38 wherein said radiation responsive component is a photorefractive material selected from the group consisting of lithium niobate, lithium tantalate and barium titanate, said photorefractive material being doped with a transition metal impurity selected from the group consisting of iron, manganese, copper and rhodium which changes said refractive index of said particles upon being impinged with incident radiation.

48. The optical device of claim 38 wherein said optical device is an optical limiter and has said predetermined wavelength equal to said specific wavelength.

49. The optical device of claim 38 wherein said optical device is an optical computer having said predetermined wavelength not equal to said specific wavelength.

50. The optical device of claim 49 including
a plurality of said radiation responsive components each being responsive to light of a different wavelength to alter the refractive index thereof to cause it to resist transmission of said specific wavelength.

51. A method of filtering incident radiation of a specific wavelength including the steps of
selecting charged particles having a first refractive index, and a first medium generally having said first refractive index such that said particles and said medium are transmittive of incident radiation,
incorporating into at least one of (a) said particles or (b) said medium a quantity of quantum-sized inclusions having the property that when exposed to radiation at a predetermined radiation wavelength and intensity causes the refractive index of at least one of (a) said particles or (b) said medium to diverge from said first refractive index to establish a difference between the refractive index of said particles and the refractive index of said medium such that radiation transmission of light at a specific wavelength is substantially entirely resisted,
introducing said particles into said medium,
forming an ordered array of said particles within said medium, and
impinging light onto said filter and resisting transmission of said radiation at said specific wavelength.

52. The method of claim 51 including
introducing said inclusions into said particles, and
selecting said quantum-sized inclusions from the group consisting of cadmium sulfide, cadmium selenide, cadmium sulfide/selenide composite, gallium arsenide, zinc oxide and lead sulfide.

53. The method of claim 52 including
impregnating said particles with said quantum-sized inclusions to a volume percentage of between about 5 and 15 percent.

54. A method of filtering incident radiation including the steps of
creating a filter by providing charged particles having a first refractive index such that said particles and said medium are transmittive of incident radiation of a predetermined wavelength which is below a predetermined radiation intensity,
impregnating at least one of (a) said particles or (b) said medium with a photoabsorbing dye substance, said dye substance being absorptive at a predetermined radiation intensity and wavelength such that heat is generated by such dye substance, whereby a change in the temperature of said particles is generated, causing a change in the refractive index of at least one of (a) said particles or (b) said medium such that the refractive index of at least one of (a) said particles or (b) said medium diverges from said first refractive index to establish a difference between the refractive index of said particles and the refractive index of said medium such that radiation transmission of a specific wavelength is substantially entirely resisted,
introducing said particles containing said dye into said medium,
forming an ordered array of said particles within said medium, and
impinging light of said specific wavelength onto said filter and resisting transmission thereof by said filter.

55. The method of claim 54 including
selecting said photoabsorbing dye substance from the group consisting of 1-8-[4-(Dimethylphenylazo)-dimethylphenylazo]-2-naphthalenol, Vitamin B-12 and ferrocene.

56. The method of claim 54 including
employing said method to make an optical limiter having said predetermined wavelength equal to said specific wavelength.

57. The method of claim 54 including
employing said method to make an optical switch having said predetermined wavelength not equal to said specific wavelength.

* * * * *